(12) United States Patent
Katagiri et al.

(10) Patent No.: US 7,986,064 B2
(45) Date of Patent: Jul. 26, 2011

(54) ELECTRICAL MOTOR

(75) Inventors: Shinichiro Katagiri, Kawasaki (JP);
Hiroaki Shibukawa, Kawasaki (JP);
Takuya Hamano, Kawasaki (JP);
Hirokazu Matsuzaki, Kawasaki (JP);
Toshihiko Yamada, Kawasaki (JP);
Takushi Fujioka, Kawasaki (JP); Yoichi Tanabe, Kawasaki (JP); Masaki Yamada, Kawasaki (JP); Hidetaka Terakubo, Kawasaki (JP); Yoshitaka Kitajima, Kawasaki (JP)

(73) Assignee: Fujitsu General Limited, Kanagawa (JP)

( * ) Notice: Subject to any disclaimer, the term of this patent is extended or adjusted under 35 U.S.C. 154(b) by 0 days.

(21) Appl. No.: 12/453,455

(22) Filed: May 12, 2009

(65) Prior Publication Data
US 2009/0284096 A1    Nov. 19, 2009

(30) Foreign Application Priority Data

May 16, 2008   (JP) ................... 2008-129133

(51) Int. Cl.
*H02K 15/02* (2006.01)
(52) U.S. Cl. .............................. 310/43; 310/9
(58) Field of Classification Search ........... 310/216.008, 310/216.013, 216.043, 216.009, 216.078, 310/216.135
See application file for complete search history.

(56) References Cited

U.S. PATENT DOCUMENTS

| | | | | |
|---|---|---|---|---|
| 4,365,180 A | * | 12/1982 | Licata et al. | 310/216.008 |
| 5,986,377 A | * | 11/1999 | Yamada et al. | 310/216.013 |
| 6,630,766 B1 | * | 10/2003 | Kirn et al. | 310/418 |
| 6,856,064 B2 | * | 2/2005 | Masumoto et al. | 310/216.008 |
| 6,919,665 B2 | * | 7/2005 | Murakami et al. | 310/216.043 |
| 7,777,387 B2 | * | 8/2010 | Nagai et al. | 310/216.043 |

FOREIGN PATENT DOCUMENTS

| | | |
|---|---|---|
| JP | H10-201146 | 7/1998 |
| JP | H11-289695 | 10/1999 |
| JP | 2000-116037 | 4/2000 |
| JP | 2003-143814 | 5/2003 |
| JP | 2006-352991 | 12/2006 |
| JP | 2008-092691 | 4/2008 |

* cited by examiner

*Primary Examiner* — Dang D Le
(74) *Attorney, Agent, or Firm* — Manabu Kanesaka

(57) ABSTRACT

There is provided an electrical motor in which the dimensional accuracy of a stator is increased more easily, and the influence exerted on a magnetic circuit is kept as little as possible. In an electrical motor in which the stator 3 formed with n number (n is a positive integer) of teeth 33 in a row in a straight line form is bent into an annular shape and the end parts thereof are connected to each other, the sum of opening angles θ of a cutout 35 formed between segments of the stator 3 is made larger than 360 degrees, and a minute clearance is formed between the opposed surfaces of the cutout 35 when the stator is bent into an annular shape.

7 Claims, 5 Drawing Sheets

ELECTRICAL MOTOR

CROSS-REFERENCE TO RELATED APPLICATIONS

The present application is based on, and claims priority from, Japanese Application Serial Number JP2008-129133, filed May 16, 2008, the disclosure of which is hereby incorporated by reference herein in its entirety.

TECHNICAL FIELD

The present invention relates to an electrical motor. More particularly, it relates to a technique for manufacturing a highly efficient electrical motor by increasing the dimensional accuracy of a stator.

BACKGROUND ART

A stator of an inner rotor type electrical motor includes a stator core in which a plurality of teeth are provided so as to project from the inner peripheral surface of a yoke formed into an annular shape toward the magnetic pole surface of a rotor. Around the outer periphery of each of the teeth of the stator core, a coil is wound via an insulator.

As examples of the method for forming the stator core, there are available a method in which annular sheet cores in which the yoke and the teeth have beforehand been formed integrally, which are formed of a magnetic steel sheet, are laminated along the direction of the shaft line of an output shaft, and a method in which straight sheet cores (straight cores) obtained by blanking the core and the teeth in a state of being connected in a straight line form for each segment are laminated, and the end parts thereof are connected to each other so that an annular shape is formed.

In the former method, the stator can be formed by two processes: a blanking process and a laminating process. In this method, since the inside portion of stator is also blanked from the magnetic steel sheet at the same time in the blanking process, many useless portions are produced undesirably. In contrast, the latter method has high production efficiency because such a useless blanking process is little.

For example, in Japanese Patent Application Publication No. H09-308143, to bend the straight core into an annular shape, a V-shaped cutout is formed between the yokes of the segments. By the formation of cutout, deformation stresses relating to the straight core concentrate in the cutout part. Therefore, deformation can be produced by a lower working stress, so that the magnetic circuit performance is also enhanced.

However, the conventional method for forming a straight core type stator has problems described below. The cutout described in Japanese Patent Application Publication No. H09-308143 is designed so that in order for the clearance of cutout to become zero when the straight core is formed into an annular shape, the opening angle of the cutout is $(360/\alpha)$, in which $\alpha$ is the number of teeth. Actually, however, the end faces on the joint side of cutouts come into contact with each other at the time of bending operation, and strain is added thereto. Therefore, an influence is exerted on a magnetic circuit to some degree.

Also, for the straight core described in Japanese Patent Application Publication No. H09-308143, two side wall surfaces of the cutout are caused to abut on each other to increase the dimensional accuracy (the degree of complete round of teeth face) at the time when the straight core is formed into an annular shape. Therefore, the blanking accuracy and the laminating accuracy of straight core must be set high, so that advanced production control is needed.

If the dimensional accuracy is poor, that is, the degree of complete round is low, an influence is exerted on the magnetic circuit of motor, and therefore the energy conversion efficiency is lowered. Besides, noise and the like are produced by vibrations and resonance when the motor is operated.

The present invention has been made to solve the above-described problems, and accordingly an object thereof is to provide an electrical motor in which the dimensional accuracy of a stator can be increased more easily while a process for bending a straight core into an annular shape is made easy, and the influence on a magnetic circuit is kept as little as possible.

SUMMARY OF THE INVENTION

To achieve the above object, the present invention has some features described below. An electrical motor in accordance with the present invention including a rotor having a rotating output shaft and a stator arranged coaxially at the outer periphery of the rotor, the stator having a stator core in which a plurality of teeth are provided so as to project from the inner peripheral surface of a yoke formed into an annular shape toward the rotor, the stator core being formed with a plurality of segments having the teeth, which are arranged in a row in a straight line form, and the stator core being bent into an annular shape and the end parts thereof being connected to each other, is characterized in that between the segments of the stator core, a cutout is provided to prevent the adjacent segments from interfering with each other when the stator core is bent into an annular shape; the cutout is formed substantially into a V shape such that the width of the cutout increases gradually from the outside diameter side toward the inside diameter side; and the sum of opening angles $\theta$ of the cutout is larger than 360 degrees.

According to this configuration, since the sum of opening angles $\theta$ of the cutout is made larger than 360 degrees, when a straight core is bent into an annular shape and connected, a clearance is formed between the side wall surfaces of the cutout, so that some play is left in the state in which the straight core is connected into an annular shape. Therefore, a room for deformation of stator core is left, so that the dimensional accuracy can be increased gradually at stages at which the stator is formed.

As a preferred mode, when the stator core is bent into an annular shape, a minute clearance is provided between opposed surfaces that are opposed to each other with the cutout being held therebetween.

According to this configuration, by providing the minute clearance between the opposed surfaces of the cutout, the side wall surfaces of the cutout can be prevented from making contact with each other when the stator core is bent into an annular shape.

The present invention also embraces a method for manufacturing the above-described electrical motor. A method for manufacturing an electrical motor including a rotor having a rotating output shaft and a stator arranged coaxially at the outer periphery of the rotor, the stator having a stator core in which a plurality of teeth are provided so as to project from the inner peripheral surface of a yoke formed into an annular shape toward the rotor, the stator core being formed with a plurality of segments having the teeth, which are arranged in a row in a straight line form, and the stator core being bent into an annular shape and the end parts thereof being connected to each other, is characterized in that the electrical motor is designed so that between the segments of the stator core, a cutout is provided to prevent the adjacent segments from interfering with each other when the stator core is bent into an annular shape; the cutout is formed substantially into a V shape such that the width of the cutout increases gradually from the outside diameter side toward the inside diameter side; and the sum of opening angles θ of the cutout is larger than 360 degrees, the method includes a stator core bending process in which the segments are bent sequentially from one end side of the stator core, and the end parts of the stator core are connected to each other to form the stator core into an annular shape; and an insert molding process in which the stator core is integrated by a resin after a coil has been wound along the teeth, and the insert molding process is also used as an aligning process in which the dimensional accuracy of the stator is achieved by causing teeth faces to coincide with a metal core formed in a part of an insert mold in which the stator core is inserted.

According to this method, by aligning the teeth faces by causing them to coincide with a guide surface formed in the insert mold, the dimensional accuracy of the stator can be increased gradually through the stator forming stages.

DETAILED DESCRIPTION

Figure 1:
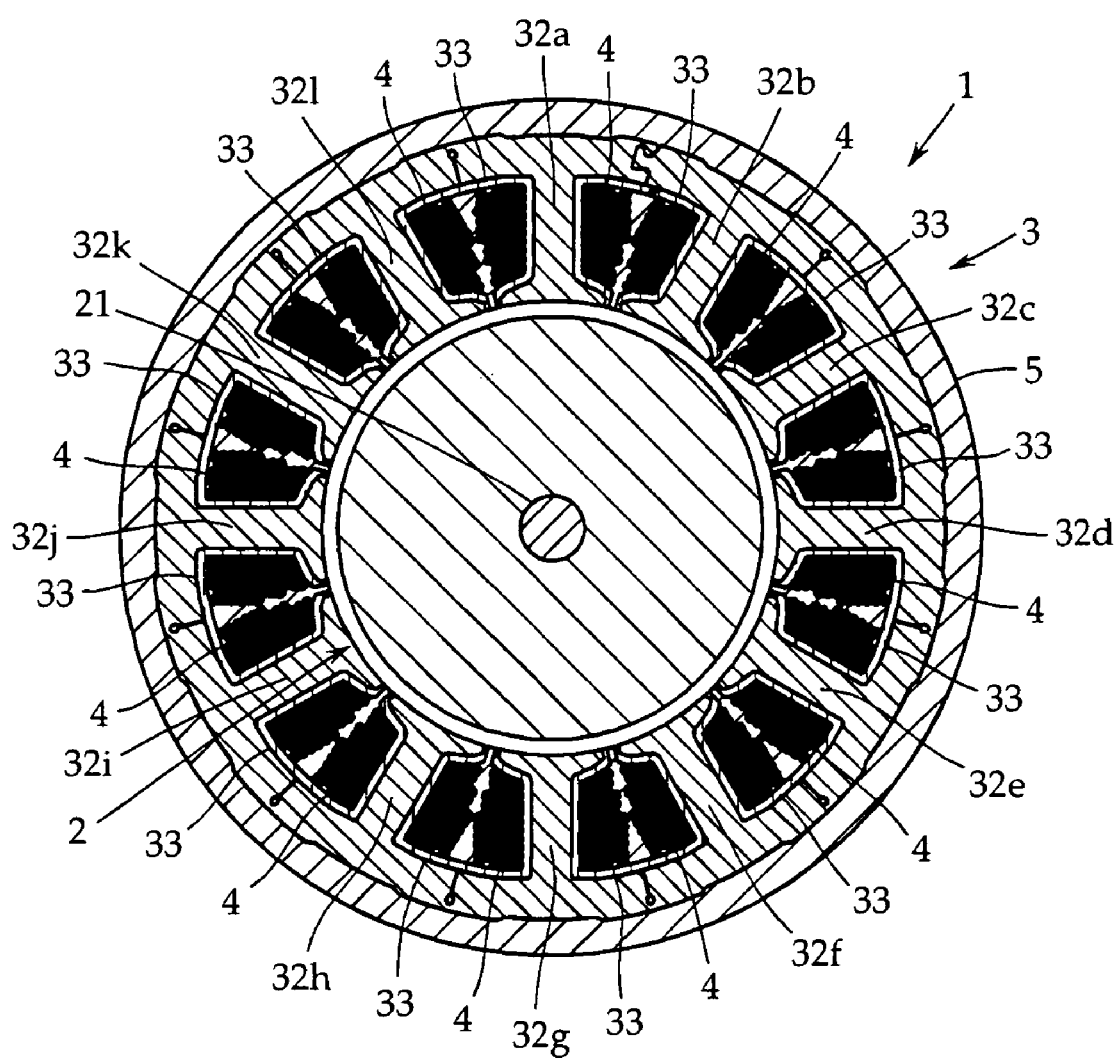
FIG. 1 is a sectional view of an essential portion of an electrical motor in accordance with one embodiment of the present invention.

An embodiment of the present invention will now be described with reference to the accompanying drawings. The present invention is not limited to this embodiment. In FIG. 1, an electrical motor 1 is an inner rotor type electrical motor including a rotor 2 having a rotating output shaft 21 and a stator 3 arranged coaxially at the outer periphery of the rotor 2. The rotor 2 may be a rotor with a permanent magnet or may be any other type of rotor having the basic configuration of an inner rotor type rotor such as a cage rotor or a wound rotor. The specific configuration of the rotor 2 may be optional.

Figure 2A:
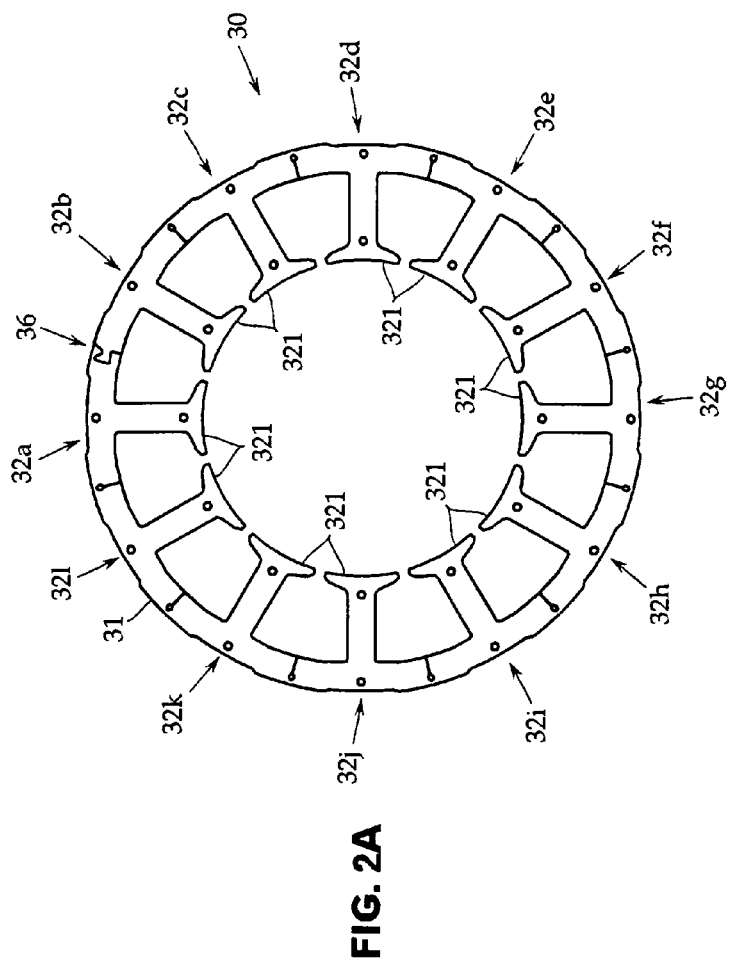
FIG. 2A is a front view of a stator core bent into an annular shape.

Referring also to FIG. 2A, the stator 3 includes a stator core 30 having a yoke 31 formed into an annular shape and a plurality of teeth (magnetic pole teeth) 32a to 32l provided so as to project from the inner peripheral surface side of the yoke 31 toward the magnetic pole surface of the rotor 2. In this example, since the induction motor has six poles, 2×6=12 teeth are provided. However, the number of teeth 32a to 32l is optional depending on the specifications. After a coil 4 has been wound, the whole of the stator 3 is integrated by insert molding using a resin 5.

For each of the teeth 32a to 32l, the outer periphery thereof excluding a teeth face 321 at the tip end is covered with an insulator 33. In this example, the insulator 33 is made of a synthetic resin, and is integrally formed on the teeth 32a to 32l by insert molding.

Although the insulator 33 is integrally formed on the teeth 32a to 32l by insert molding in this example, the insulator 33 may be a separate element. For example, two insulator members divided into two in the axial direction may be installed so as to hold the teeth 32a to 32l from the upside and the downside.

The coil 4 is wound around the teeth 32a to 32l via the insulator 33. The coil 4 is connected with a predetermined connection pattern. In the present invention, the connection pattern of the coil 4 is optional, and the winding sequence and the connection of main winding, auxiliary winding, reduction winding, and the like may be selected arbitrarily according to the specifications.

Figure 2B:
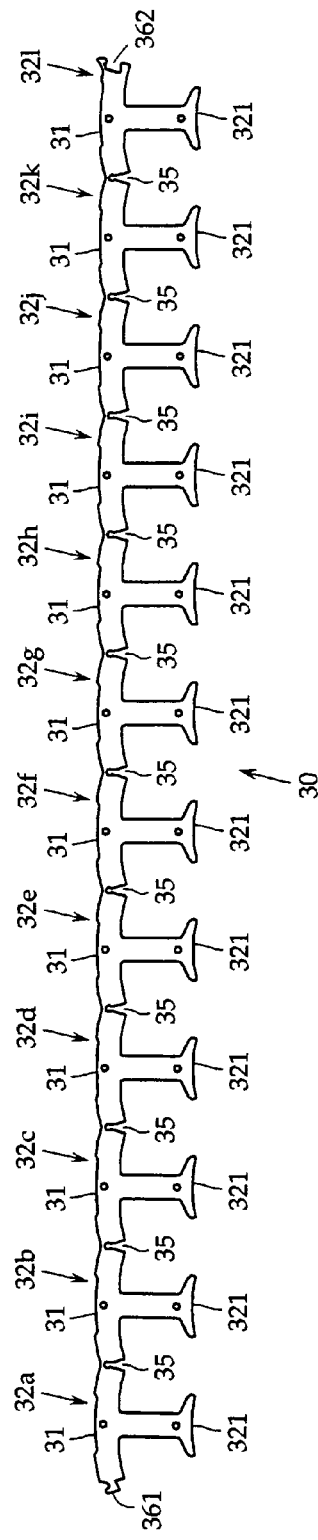
FIG. 2B is a front view of a stator core before being formed into an annular shape.

As shown in FIG. 2B, the stator core 30 has a straight core structure in which the yoke 31 and the teeth 32a to 32l are blanked from a magnetic steel sheet in a state of being connected in a straight line form for each segment. The stator cores 30 are laminated in a multilayer form along the axial direction simultaneously with the blanking operation. A part of the yoke 31 and the teeth 32a to 32l is provided with a half-blanked hole 34. The half-blanked hole 34 is used to engage the magnetic steel sheets with each other when the magnetic steel sheets are laminated.

Figure 3:
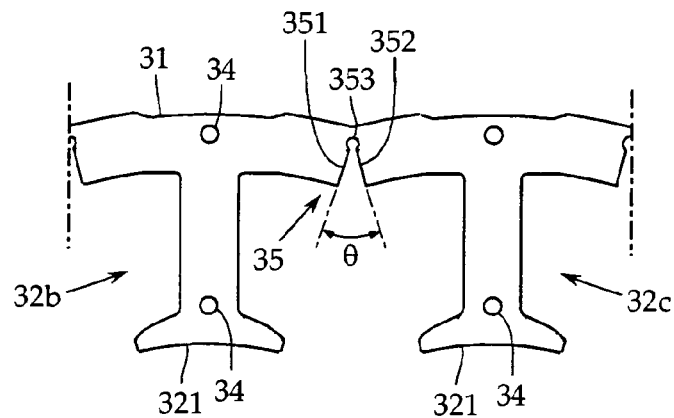
FIG. 3 is a partially enlarged front view of a stator core.

As shown in FIG. 3, between the segments of the stator core 30 (in this example, between the teeth 32b and the teeth 32c), a cutout 35 is provided. The cutout 35 is used to make the stator core 30 easy to bend when the stator core 30 is bent into an annular shape.

Although the stator core 30 is formed by bending one straight core into an annular shape in this example, the stator core 30 may be divided into a plurality of stator core members. For example, a plurality of stator core members formed into a rod shape such that one core member consists of three segments may be prepared, and these stator core members may be connected by being arranged in a straight line form. In this case, the connection end of core member need not be provided with a notch 353, described later.

The cutout 35 is formed into a V shape (in FIG. 3, an inverse V shape) such that the width of the opening thereof increases gradually from the outside diameter side toward the inside diameter side. The joint part of the cutout 35 (the joint part between side wall surfaces 351 and 352 of the cutout 35) is provided with the notch 353 used to concentrate the working stresses on the connection part when the teeth 32b and the teeth 32c are bent.

The notch 353 consists of a concave part formed by cutting a part of the side wall surface 351, 352 into an arcuate shape. Since deformation stresses are concentrated on the connection part between the segments by the notch 353, the stator core 30 can be deformed by a lower working stress. Further, since the notch 353 is formed into an arcuate shape, the stator core 30 can be deformed more evenly.

The cutout 35 is designed so that the sum of opening angles θ thereof is larger than 360 degrees. In this embodiment, since the number of teeth is 12, the cutout 35 is formed so that the opening angle θ thereof is larger than 30 degrees.

Although all of the cutouts 35 are designed so that the opening angle θ thereof is 30 degrees in this example, the opening angle θ may be variable, for example, 30 degrees or 35 degrees, for each cutout 35. If the sum of opening angles θ thereof is larger than 360 degrees, the modifications are embraced in the present invention.

That is to say, it is preferable that when the teeth 32a to 32l are bent into an annular shape via the cutout 35, a minute clearance be formed between both the side wall surfaces 351 and 352 of each cutout 35.

By making the opening angle θ large, the work for bending the stator core 30 of straight core structure into an annular shape is made easy. When the stator core 30 is bent, the stator core 30 is bent with a bend support point in the connection part between the segments being the center. If the bend support point varies, in the conventional straight core structure, the side wall surfaces of cutout do not make contact with each other in parallel, so that the stator core 30 cannot sometimes be bent in an annular shape.

In contrast, in the present invention, since the opening angle θ is made large, variations in bend support point position can be absorbed by the aforementioned clearance. Therefore, the straight core can easily be bent into an annular shape.

As a further preferred mode, the clearance G is preferably in the range of $0\,\mu m \leqq G \leqq 100\,\mu m$. According to this mode, the influence exerted on the magnetic circuit can be reduced, so that the energy conversion efficiency can be prevented from lowering.

Figure 5:
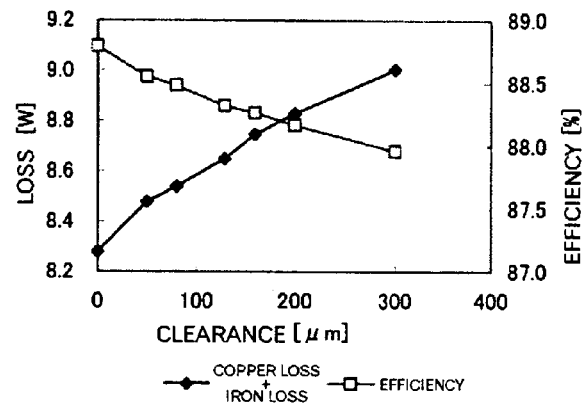
FIG. 5 is a graph showing the relationship between a clearance of cutout in a stator and energy loss.

As shown in FIG. 5, the minute gap G between both the side wall surfaces 351 and 352 of the cutout 35 and the energy loss are in inverse proportion to each other. Therefore, the smaller the clearance G is, the lower the energy loss is. However, in the case where the clearance G is 0 μm, the side wall surfaces make contact with each other at the time of working, and the working strain accumulates, so that an influence may be exerted on the magnetic circuit. In the case where the clearance G is larger than 100 μm, as shown in FIG. 5, a great influence is exerted on the magnetic circuit, so that the energy conversion efficiency may be lowered.

Figure 4A:
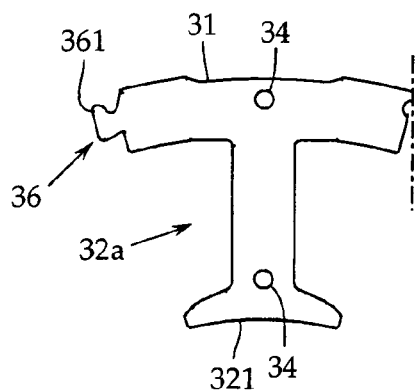
FIG. 4A is a partially enlarged front view in which the left end of a stator core is enlargedly shown.
Figure 4B:
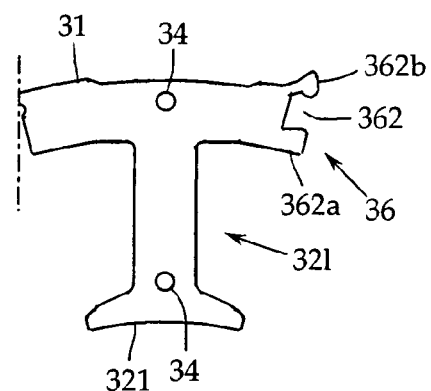
FIG. 4B is a partially enlarged front view in which the right end of a stator core is enlargedly shown.
Figure 4C:
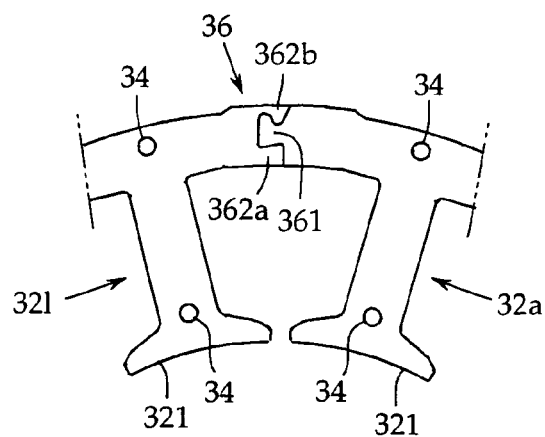
FIG. 4C is a partially enlarged view showing a state in which end parts are connected to each other.

Next, referring to FIGS. 4A to 4C, at both ends of the stator core 30, a connecting means 36 is provided to connect the stator core 30 that is in a state of being bent into an annular shape. The connecting means 36 includes a locking convex part 361 provided in one end part (in this example, the teeth 32a) of the stator and a locking concave part 362 provided in the other end part (in this example, the teeth 321).

The locking convex part 361 is provided so as to project from the side end part of the yoke 31 of the stator core 30. The locking convex part 361 is formed into a hook shape so as to be engaged with the locking concave part 362. The locking concave part 362 is provided with a pair of clamp arms 362a and 362b. The clamp arms 362a and 362b support the locking convex part 361 by holding it therebetween from the up and down direction (radial direction).

As shown in FIG. 4B, one clamp arm 362b is formed in an opened state when it is in a straight state. Therefore, after the stator core 30 has been bent into an annular shape, and the locking convex part 361 has been caused to coincide with the clamp arm 362a, the opened clamp arm 362b is closed by staking, by which the locking convex part 361 and the locking concave part 362 are engaged with each other as shown in FIG. 4C.

Figure 6:
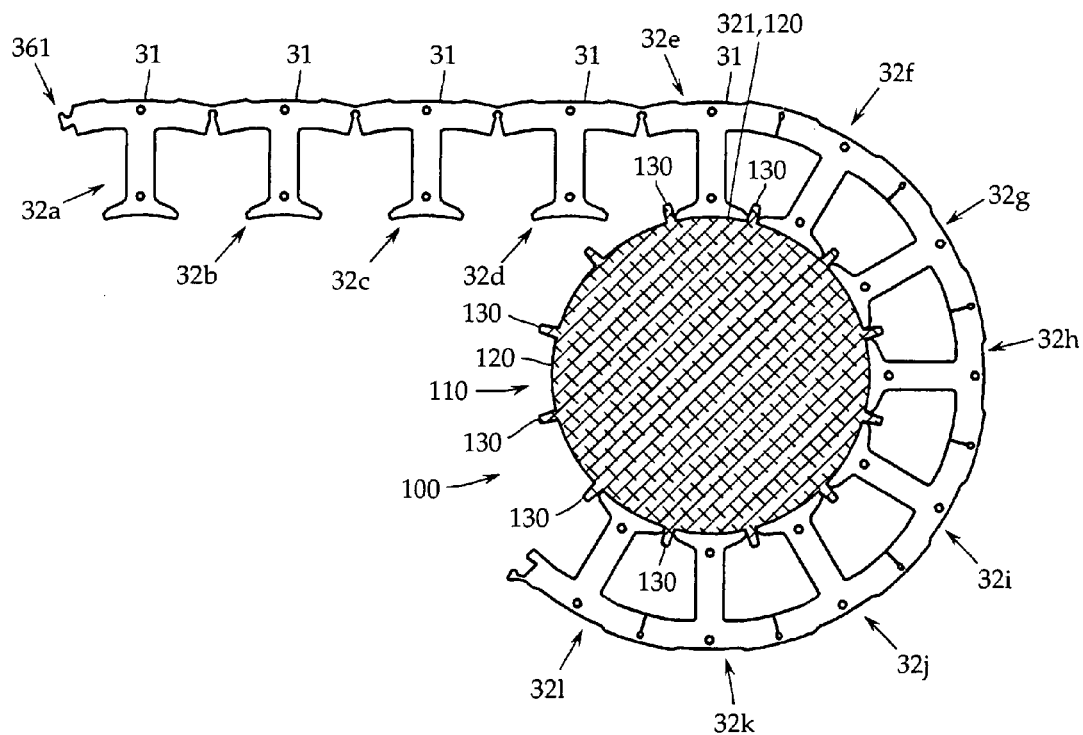
FIG. 6 is an explanatory view for explaining a stator core bending process for forming a straight core into an annular shape.
Figure 7:
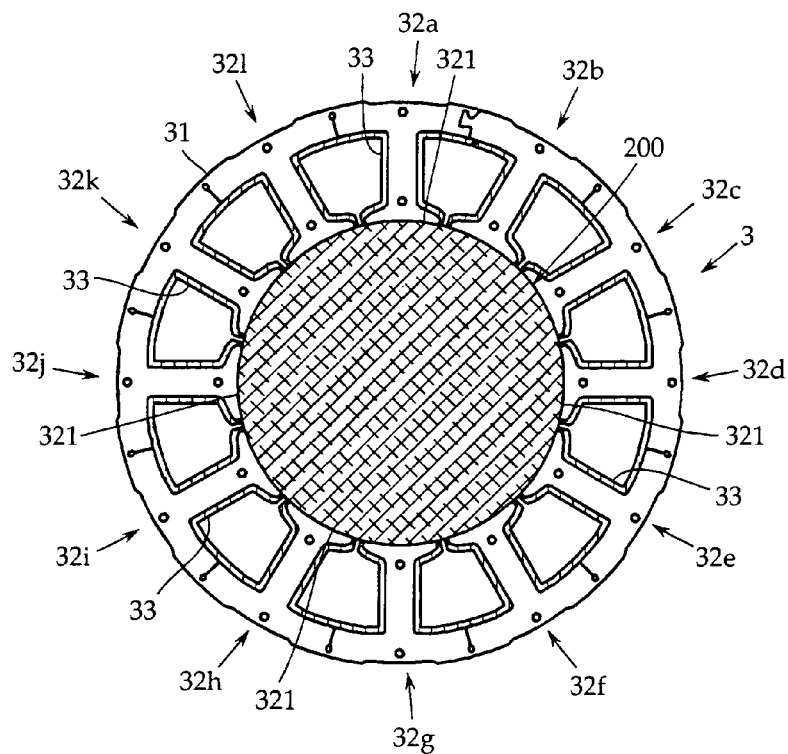
FIG. 7 is an explanatory view for explaining an insulator forming process for forming an insulator on a stator core.
Figure 8:
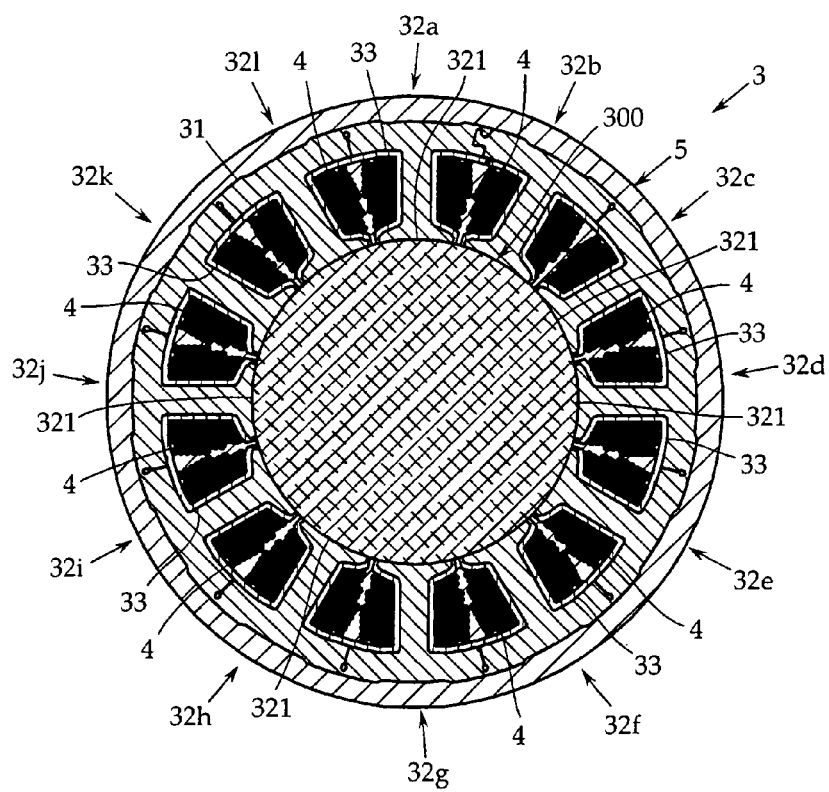
FIG. 8 is an explanatory view for explaining an insert molding process in which a stator core is integrated by a resin.

Next, referring to FIGS. 6 to 8, one example of a procedure for assembling the stator 3 is explained. It is assumed that the stator core 30 has been formed into a straight form by laminating many magnetic steel sheets that have been blanked beforehand through a predetermined blanking process.

First, the stator core 30 having been formed into a straight form is bent into an annular shape. As shown in FIG. 6, the stator core 30 is bent by using a metal pedestal 100 attached to a predetermined bend forming machine, which is formed into a columnar shape (stator core bending process).

The metal pedestal 100 is formed into a columnar shape and is rotationally driven by a driving means, not shown. On the outer peripheral surface of the metal pedestal 100, engagement concave parts 110 are provided in number that is the same as the number of teeth 32a to 32l, in this example, at 12 places. The engagement concave parts 110 are engaged with the tip end parts of the teeth 32a to 32l of the stator core 30.

Each of the engagement concave parts 110 includes an arcuate guide surface 120 formed so as to be in agreement with the teeth face 231 in terms of shape and a pair of guide ribs 130 for holding the side end faces of the teeth 32a to 32l.

The metal pedestal 100 is rotated while one end side of the stator core 30 is caused to coincide with the engagement concave part 110 sequentially from the right-end teeth 321 in this example, by which the stator core 30 is bent into an annular shape gradually along with the rotation of the metal pedestal 100.

Although not shown in FIG. 6, the bend forming machine is preferably provided with a fixing means for pressing the outer peripheral surface of the stator 3 to prevent the stator core 30 from behaving violently or shifting at the time of bending operation. The configuration of the fixing means is optional.

This stator core bending process is also used as a first aligning process in which the dimensional accuracy (the roundness: the degree of complete round of teeth face) of the stator core 30 is increased by pressing the teeth face 321 of the teeth 32a to 32l against the guide surface 120 when the stator core 30 is bent.

As described above, for the stator core 30 of the present invention, since the opening angle θ is large, work for bending the stator core 30 into an annular shape is easy. Also, since the cutout 35 of the stator core 30 is provided with a minute clearance even in the state in which the stator core 30 is bent into an annular shape, the structure of the stator core 30 is deformed easily. Therefore, the teeth face 231 can be caused to coincide with the guide surface 120 with high accuracy, so that the degree of complete round of the teeth face 231 of the stator 3 can be increased.

According to this configuration, as compared with the case where the dimensional accuracy is secured by causing the side wall surfaces 351 and 352 of the cutout 35 to abut on each other as in the conventional art, even if the opening angle θ or the bend support point position varies, distortion as a whole produced on the teeth 32a to 32l is removed by causing the teeth face 231 to coincide with the guide surface 120, so that the dimensional accuracy can be increased further.

After the stator core 30 has been bent into an annular shape by the stator core bending process, both ends of the stator core 30 are locked to each other via the connecting means 36. Thereby, the stator core 30 is formed into an annular shape.

In the stator core bending process, the metal pedestal 100 need not necessarily be provided with the aforementioned engagement concave parts. Also, the alignment using the metal pedestal 100 need not necessarily be performed in the stator core bending process if the degree of complete round can be increased so as to be not lower than a specified value in an insert molding process, described later.

Next, the insulator 33 is integrally formed at the outer periphery of the teeth 32a to 32l of the stator core 30 by insert molding (insulator forming process). As shown in FIG. 7, in the insulator forming process, the stator core 30 is inserted along a cylindrical metal core 200 provided in a mold provided in an insert molding machine (both elements not shown), and the outer peripheral surface of the teeth 32a to 32l is integrally covered with the insulator 33. At this time, the stator core 30 is held in the mold in the state in which the teeth face 231 and the outer periphery of the back yoke 31 are supported.

The metal core 200 is formed into a columnar shape and is provided so as to project in the mold. The surface of the metal core 200 coincides with the teeth faces 321 of the stator core 30 as a guide surface. After the annular stator core 30 has been inserted into the mold along the metal core 200, a resin is poured into the mold to perform insert molding, by which the insulator 33 is formed on the teeth 32a to 32l excluding the teeth faces 321 and the outer periphery of the back yoke 31.

This insulator forming process is also used as a second aligning process in which the dimensional accuracy of the stator core 30 is further increased by engaging the teeth face 321 of the stator core 30 with the outer peripheral surface of the metal core 200.

By increasing the degree of complete round of the outer peripheral surface of the metal core 200, the degree of complete round of the teeth face 321 is increased. Therefore, the dimensional accuracy of the stator core 30 itself can be further increased simultaneously with the formation of insulator.

After the insulator 33 has been assembled in the stator core 30, a coil is wound around the teeth 32a to 32l by a coil winding machine, not shown. The coil is connected with the predetermined connection pattern. Thereafter, the stator 3 is integrated by insert molding together with the synthetic resin (insert molding process).

As shown in FIG. 8, the insert molding process is a series of steps from a step in which the stator 3 mounted with the insulator 33 and the coil 4 is inserted along a metal core 300 in the mold provided in the insert molding machine (both elements not shown) to a step in which the whole of the stator 3 is covered with a resin.

The metal core 300 has a columnar shape and is provided so as to project in the mold, not shown. The surface of the metal core 300 coincides with the teeth faces 321 of the stator 3 as a guide surface. The metal core 300 has almost the same configuration as that of the metal core 200 used in the above-described insulator forming process.

After the stator 3 has been inserted into the mold along the metal core 300, a resin is poured into the mold to perform insert molding. Thereby, the resin 5 is integrally formed on the whole of the stator 3 excluding the teeth faces 321.

At this time, by the enclosing pressure of the resin poured into the mold, the outer periphery of the stator core 30 is pressed against the inside diameter side. By this pressing force, the teeth face 321 is pressed against the outer peripheral surface of the metal core 300, by which the degree of complete round of the stator teeth face is further increased. That is to say, the insert molding process is also used as a final process in which the dimensional accuracy (the degree of complete round of stator teeth face) of the stator 3 is increased.

In this embodiment, the stator 3 is completed through the above-described processes. However, the stator 3 may be completed by forming the insulator on the stator core 30 in a straight state integrally or separately and by bending the stator core 30 into an annular shape after the coil has been wound. In this case, the space factor of coil is further improved.

Also, in this embodiment, the teeth 32a to 32l are provided in all of the segments of the stator core 30. However, the present invention can be applied to a stator core of a type such that some of the segments are not provided with the teeth.

According to the present invention, by making the opening angle θ large, the straight core can easily be bent into an annular shape even if the bend support point varies. Since the minute clearance is provided in the cutout 35 of the stator 3, the stator core 30 is easily deformed, so that the teeth face 321 can be pressed against the metal core. As a result, the dimensional accuracy of the stator 3 can be achieved easily with high accuracy.

The invention claimed is:

1. An electrical motor comprising;
   a rotor, having a rotating output shaft, and
   a stator arranged coaxially at an outer periphery of the rotor, and having a stator core, the stator core having a yoke formed into an annular shape and a plurality of teeth projecting from an inner peripheral surface of the yoke toward the rotor, the stator core being formed with a plurality of segments having the teeth, which are arranged in a row in a straight line form, and the stator core being bent into an annular shape and the end parts thereof being connected to each other,
   wherein between the segments of the stator core, a cutout is provided to prevent the adjacent segments from interfering with each other when the stator core is bent into the annular shape; the cutout is formed substantially into a V shape such that a width of the cutout increases gradually from an outside diameter side toward an inside diameter side; and a sum of opening angles θ of the cutout is larger than 360 degrees,
   wherein when the stator core is bent into the annular shape, a minute clearance is provided between opposed surfaces which are opposed to each other with the cutout being held therebetween, and
   wherein the stator core with a plurality of the segments includes a locking convex part projection from one lateral end surface of the stator core arranged in the row, the locking convex part having a hook projecting toward an outer periphery of the stator core, and a locking concave part projecting from the other lateral end surface of the stator core arranged in the row, the locking concave part having upper and lower clamp arms, the upper clamp arm being inclined toward the outer periphery when the segments are arranged in the row and having a projection at a side of the lower clamp arm so that when the upper clamp arm is bent toward the lower clamp arm in a condition that the segments are arranged in the annular shape, the locking convex part is held between the upper and lower clamp arms.

2. The electrical motor according to claim 1, wherein the segments of the stator core are arranged to the annular shape in a condition that the upper clamp arm is inclined and opened relative to the lower clamp arm.

3. The electrical motor according to claim 2, wherein the segments are arranged into the annular shape to increase accuracy thereof by the minute clearance and a condition that the upper clamp arm is opened relative to the lower clamp arm.

4. The electrical motor according to claim 3, wherein the upper clamp arm is arranged to be bent to the lower clamp arm in a condition that the segments are arranged in the annular shape.

5. The electrical motor according to claim 1, wherein the minute clearance between two segments located adjacent to each other is greater than zero and less that 100 μm.

6. The electrical motor according to claim 5, wherein the segments adjacent to each other are connected at side surfaces thereof.

7. The electrical motor according to claim 6, wherein the opposed surfaces of the segments forming the V shape are smooth surfaces.

* * * * *